(12) United States Patent
Truman, Jr. et al.

(10) Patent No.: US 8,208,201 B2
(45) Date of Patent: Jun. 26, 2012

(54) OPTICAL MICROSCOPE APPARATUS

(75) Inventors: Stanley A. Truman, Jr., Dupo, IL (US); W. Eric Rowley, Montpeller, OH (US)

(73) Assignee: TBC Optics, LLC, Columbia, IL (US)

( * ) Notice: Subject to any disclaimer, the term of this patent is extended or adjusted under 35 U.S.C. 154(b) by 330 days.

(21) Appl. No.: 12/578,845

(22) Filed: Oct. 14, 2009

(65) Prior Publication Data
US 2011/0085236 A1    Apr. 14, 2011

(51) Int. Cl.
G02B 21/00    (2006.01)
G02B 5/04    (2006.01)

(52) U.S. Cl. ........ 359/368; 385/385; 385/834; 385/836; 385/837

(58) Field of Classification Search ............. 359/368, 359/385, 831, 833, 834, 836, 837
See application file for complete search history.

(56) References Cited

U.S. PATENT DOCUMENTS

| | | | |
|---|---|---|---|
| 883,868 A | 4/1908 | Ford | |
| 1,727,618 A | 9/1929 | Rife | |
| 2,255,631 A | 9/1941 | Schulman | |
| 2,601,175 A | 6/1952 | Smith | |
| 3,122,602 A | 2/1964 | Page | |
| 3,129,353 A | 4/1964 | Nemes | |
| 3,511,552 A | 5/1970 | Osterberg | |
| 4,972,258 A * | 11/1990 | Wolf et al. | 348/79 |
| 5,260,562 A | 11/1993 | Bearden et al. | |
| 5,602,820 A * | 2/1997 | Wickramasinghe et al. | 369/126 |
| 5,907,432 A * | 5/1999 | Hayasaka | 359/384 |
| 5,986,801 A * | 11/1999 | Volk et al. | 359/376 |
| 6,865,013 B2 | 3/2005 | Vodyanoy et al. | |
| 7,106,503 B2 | 9/2006 | Vodyanoy et al. | |
| 7,259,911 B2 * | 8/2007 | Winterot et al. | 359/431 |
| 2006/0103923 A1 * | 5/2006 | Dietrich et al. | 359/385 |

OTHER PUBLICATIONS

R.E. Seidel, M.D., The New Microscopes, Journal of the Franklin Institute, Feb. 1944, 103-130, 237-2, The Franklin Institute of the State of Pennsylvania.
Royal R. Rife, Presenting a brief history of the Evolution of the Microscope, The Aerohrcrafter, Jan. 10, 1954.
W.E. Rowley, Redevleopment of the Prismatic Monochromatic Light Microscope, Nonwovens World A Journal for Management, Spring 2007, 84-87, 16-2.
Paper describing the principles used in the Rife Microscope, author, publication, date unknown.

* cited by examiner

*Primary Examiner* — Frank Font
(74) *Attorney, Agent, or Firm* — Husch Blackwell LLP; Mark E. Stallion

(57) ABSTRACT

An embodiment of the present invention provide for an optical microscope apparatus including a light source, a base unit, a rotary monochromatic dispersion unit, a condenser, a stage, an objective, a tubular assembly and an ocular assembly. In a preferred embodiment, light travels from the light source sequentially through each of these seven components, producing an image of the contents of a slide on the stage to a user looking through the ocular assembly. In the base unit, in place of a standard mirror which would direct the light vertically up into the scope along the z-axis, a right angle piece of single crystal Calcite, known as Iceland Spar is used, which has a birefringent affect upon the light as it passes up through the scope.

2 Claims, 24 Drawing Sheets optical axis 45°±15' optical axis 45°±15'

37 mm

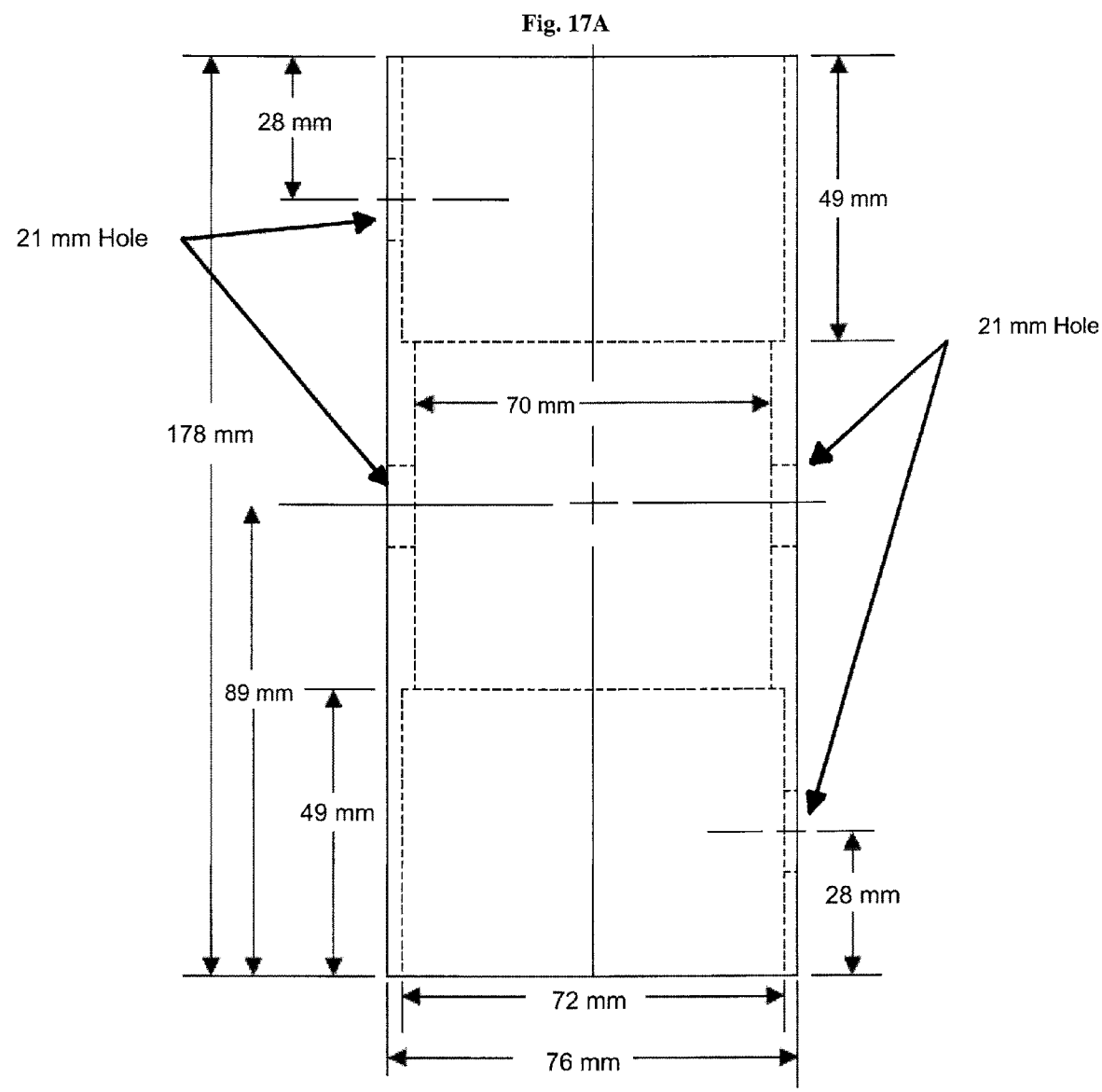

OPTICAL MICROSCOPE APPARATUS

BACKGROUND OF INVENTION

1. Field of Invention

The present invention relates to a microscope apparatus for viewing microscopic features. More specifically, the present invention relates to an optical microscope which provides high contrast and sharp images, providing for higher detail.

2. Background Art

Microscopes have assisted scientists and researchers for hundreds of years. From chemistry to the construction of computer chips to genetics to medical research, nearly every imaginable discipline has benefited from the ability to magnify the very small.

The oldest of microscopes were optical in nature, and were comprised of little more than a few lenses and a light source. These microscopes use the visible wavelengths of light to observe the microscopic. Over time, such optical microscopes have become more and more complex using dozens of lenses and reflecting/refracting elements. Medical researchers often use optical microscopes, as they allow living specimens to be observed without causing harm to the specimens. Today, such optical microscopes are considered to have a "theoretical limit" of resolution of about 200 nanometers—more precisely, 187 nanometers—because of the resolution limitations of lenses, the limited wavelengths of visible light, and limitations on the angular apertures of lenses. Thus, things smaller than approximately 0.2 microns are not readily viewable through standard optical microscopes. Even when viewing features at this lower resolution limit, some contrasts and color are often lost.

More recent developments in microscopy have resulted in electron microscopes, which use beams of electrons instead of beams of light. As electrons can be accelerated to produce a much smaller wavelength than visible light, electron microscopes allow much higher resolution than standard optical microscopes.

However, while electron microscopes can resolve features less than 0.2 microns, they typically cannot be used on living specimens. Electron microscopes use very high energy electron beams which can be harmful to living specimens. Also, to be viewed by an electron microscope, each specimen must be placed in a vacuum for viewing, as a gas would improperly scatter the electron beam, which vacuum would cause the death of a living specimen. Further, electron microscopes are often quite expensive to purchase and maintain, and require special power sources and a stable building.

Therefore, it would be preferable to combine the higher resolution qualities of an electron microscope with the lower expense and the ability to view living specimens of an optical microscope. It would further be preferable to view true color and high contrast images through an optical microscope.

BRIEF SUMMARY OF THE INVENTION

One or more of the embodiments of the present invention provide for an optical microscope apparatus including a light source, a base unit, a rotary monochromatic dispersion unit, a condenser, a stage, an objective, a tubular assembly and an ocular assembly. In a preferred embodiment, light travels from the light source sequentially through each of these seven components, producing an image of the contents of a slide on the stage to a user looking through the ocular assembly.

In the base unit, in place of a standard mirror which would direct the light vertically up into the scope along the z-axis, a right angle piece of single crystal Calcite, known as Iceland Spar is used, which has a birefringent affect. The double refracted light then passes up through the rotary monochromatic dispersion unit, which contains at least one Risley Prism, and then up through a standard condenser, stage (with slide) and objective. The light then travels through the tubular assembly which includes an Abbe Koenig prism, and then up through the ocular assembly.

Another embodiment provides for an optical microscopy method including the steps of directing light from a light source through a birefringent material, directing said light from said birefringent material through a standard microscope condenser, stage and objective, directing light from said objective through a tubular assembly containing an Abbe Koenig prism, and directing light from said tubular assembly through an ocular assembly for viewing by a user.

BRIEF DESCRIPTION OF THE DRAWINGS

For a better understanding of the present invention, reference may be made to the accompanying drawings in which:

FIG. 17A is a side view diagram of a tubular assembly.

DETAILED DESCRIPTION OF THE INVENTION

Figure 1:
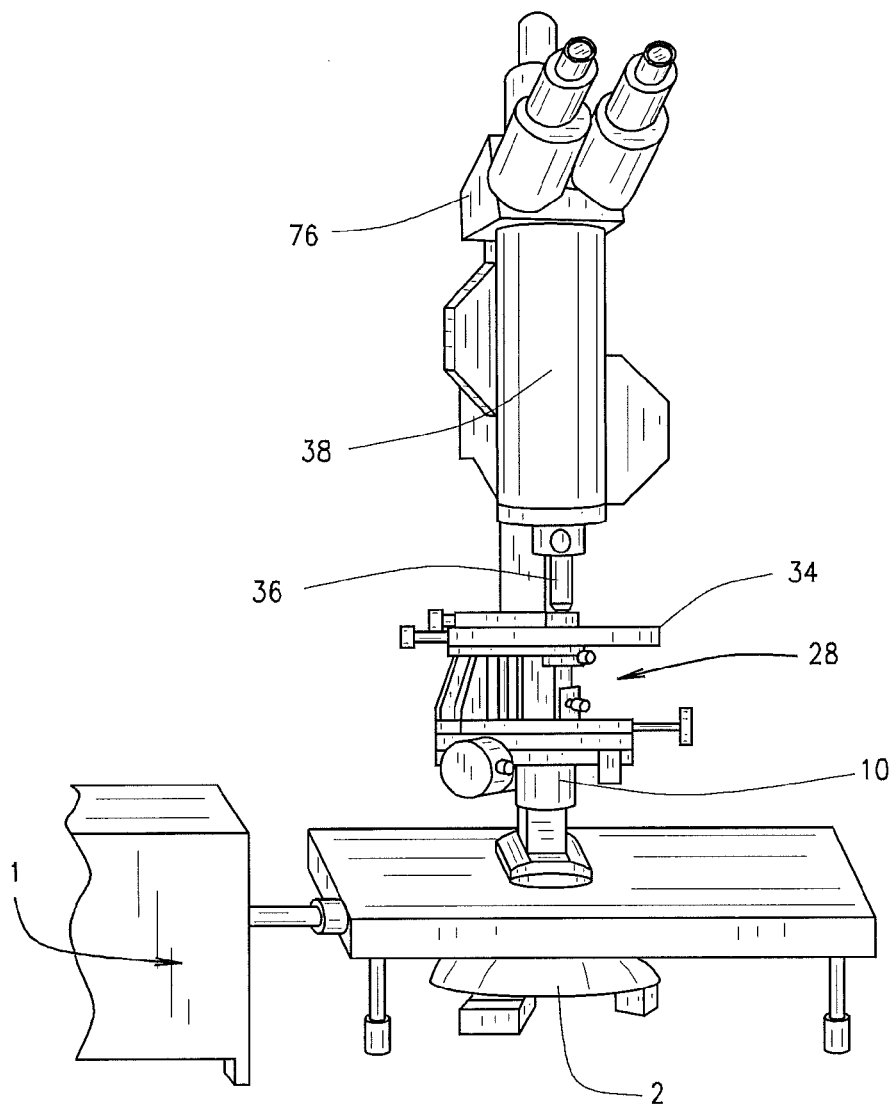
FIG. 1 is a photograph of a microscope according to one embodiment of the present invention.

In one embodiment of the present invention, the microscope is an optical microscope that may be capable of resolving details smaller than 50 nanometers. As can be seen in FIG. 1, which is an image of the full microscope, the scope is comprised of eight main sections. See FIGS. 20 and 23 for exploded views of the optical components of the scope.

I. & II. Light Source (1) and Base Unit (2)

Figure 2A:
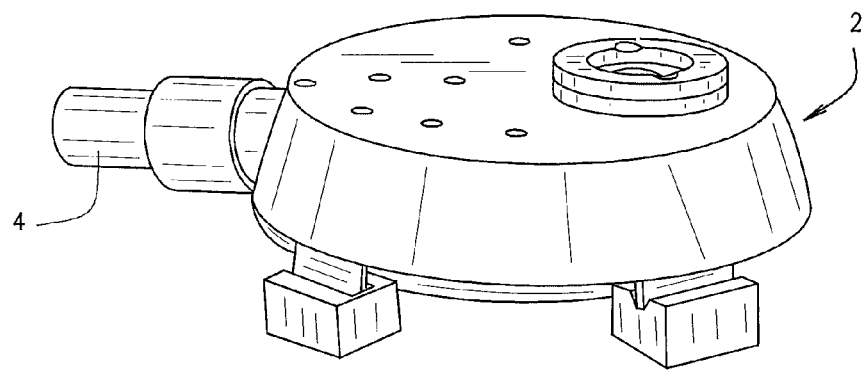
FIG. 2A is a perspective view of a base unit.
Figure 2B:
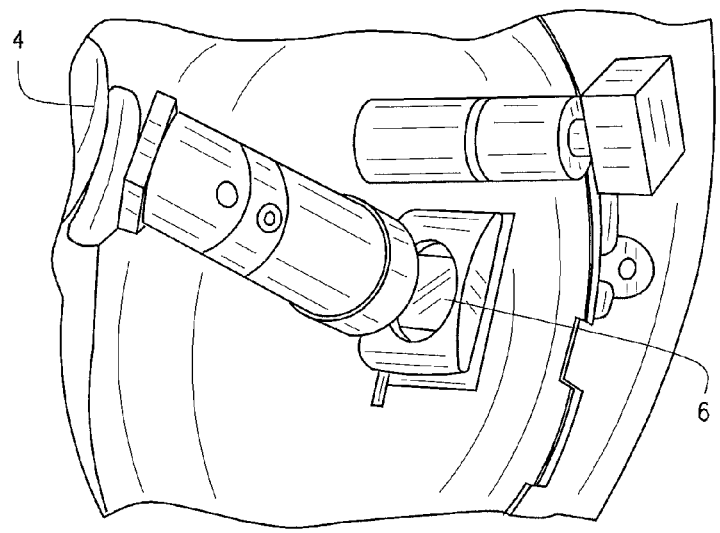
FIG. 2B is a bottom view of a base unit having an Iceland Spar prism.
Figure 3A:
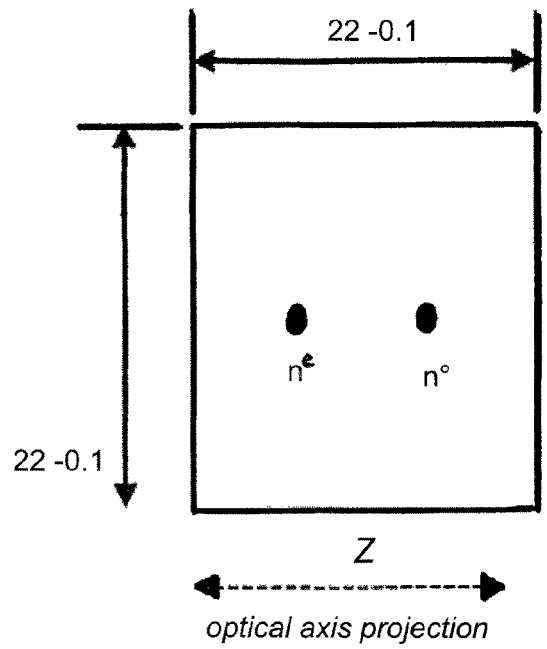
FIGS. 3A-3C are diagrams of light paths through a right angle Iceland Spar prism from various angles.
Figure 3B:
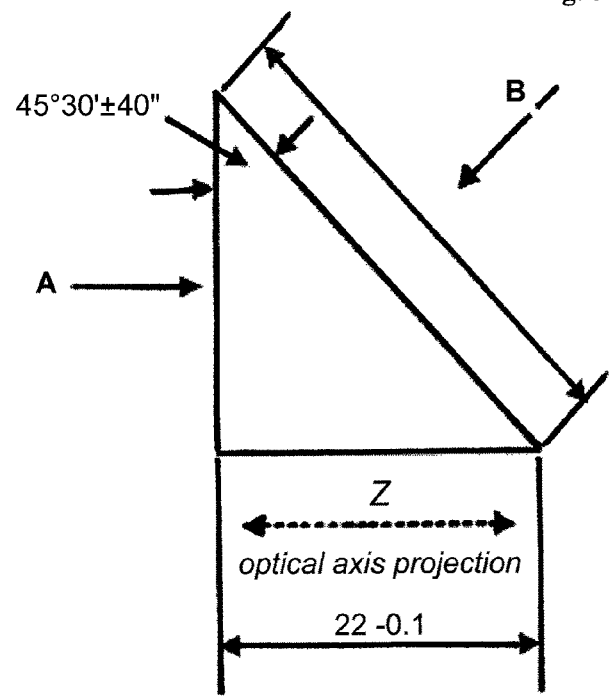

Light source (1) of the Truman Nanoscope is preferably a MicroLite FL2000 light source, though most any light source could be used. Light source (1) outputs light to the base unit (2) of the scope through the light input path (4), shown in FIG. 2A. Base unit (2) is that of a Zeiss Microscope, model 4290785, though, again, nearly any base could be acceptably substituted. However, in the Zeiss base unit (2), in place of a standard mirror which would direct the light vertically up into the scope along the z-axis, a right angle piece of single crystal Calcite, known as Iceland Spar (6) and measuring 22 mm×22 mm×22 mm with an angle of 45°30' (±40"), is present. See FIG. 2B. The Iceland Spar (6) has: a linear tolerance of +0, −0.1 mm; an angular tolerance of +/−40 arc sec; three rectangular surfaces polished 60/40 scratch/dig and ¼ wave at 520 nm flat and two triangular surfaces fine ground; and bevel of 0.3 mm nom.×45 deg. Additional specifications of the right angle piece of Iceland Spar (6) are given in FIGS. 3A-3C.

Figure 3C:
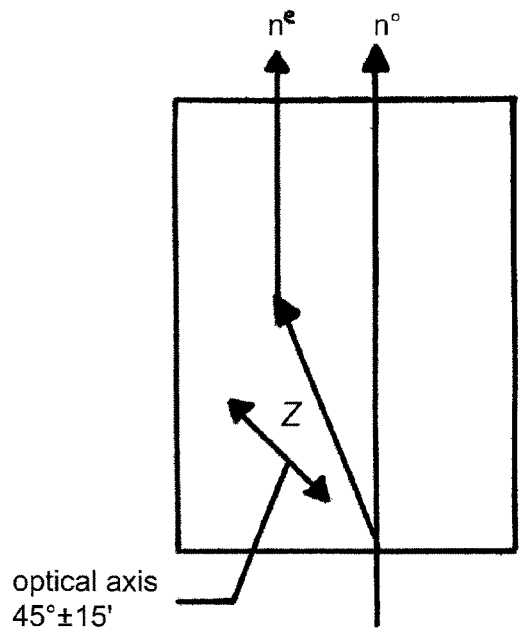
Figure 4:
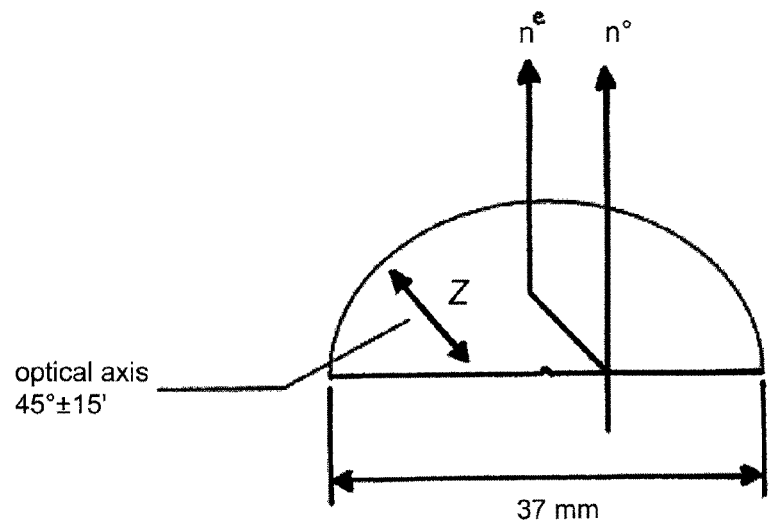
FIG. 4 is a diagram of the light path through a plano-convex lens made of Iceland Spar.

Iceland Spar, formerly known as Iceland Crystal, is a transparent form of calcite or crystallized calcium carbonate. It is a birefringent material, and thus has two difference refractive indices. Iceland Spar therefore splits light into an ordinary wave ("o-wave") and an extraordinary wave ("e-wave") as shown in FIG. 3C. If a material has a single axis of anisotropy (directional dependence) or optical axis (i.e. it is uniaxial), birefringence can be formalized by assigning two different refractive indices to the material for different polarizations. The birefringent magnitude is then defined by the formula $\Delta n = ne - no$, where for calcite the refractive indices are: $\Delta n = -0.172$; $ne = 1.486$; and $no = 1.658$. A plano-convex lens made of Iceland Spar could also be used. See FIG. 4.

Figure 5:
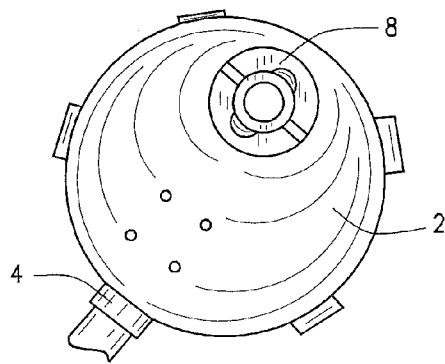
FIG. 5 is a top view of a base unit.

Once the light has passed through the Iceland Spar (6) and has been directed upward, it travels approximately 10-mm and leaves the base unit through a first glass-protected iris (8) with a diameter of between 22-mm and 1-mm. See FIG. 5. It is noted that all distances between optical components discussed hereinafter are approximate. This iris (8) is original to the Zeiss base unit (2) described above, and controls the amount of light which passes through. After the light has passed through the iris (8), it leaves base unit (2) and travels 7-mm to the Rotary Monochromatic Dispersion Unit (10) where it encounters the Risley Prism (12).

III. The Rotary Monochromatic Dispersion Unit (10)

Figure 6A:
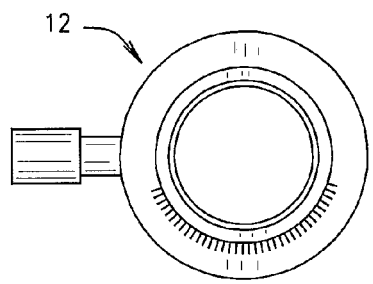
FIGS. 6A and 6B are top and side views of a Risley Prism.
Figure 6B:
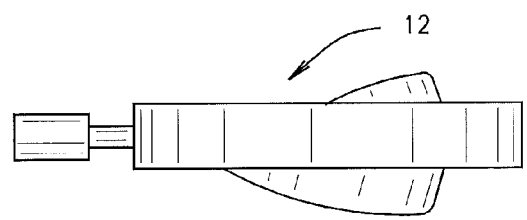
Figure 7A:
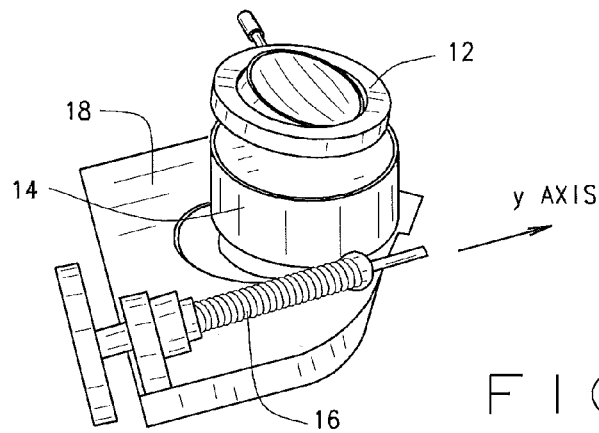
FIG. 7A-7C are perspective, side and top views of a rotary monochromatic dispersion unit.

The light then travels vertically along the z-axis through a 15°, 1.25 inch diameter Risley Prism 12, which consists of two 15° prisms mounted such that rotating one of the prisms in one direction causes the other to be rotated an equal amount in the opposite direction and vice versa. See FIGS. 6A, 6B. The Risley Prism (12) is mounted inside a housing (14), which housing (14) is moveably connected to a threaded rod (16) allowing the Risley Prism (12) and housing (14) to move frontward and rearward (on the y-axis) by several decimeters. The Risley housing (14) and the threaded rod (16) are mounted to a Risley Mounting Bracket (18). See FIG. 7A (Rotary Monochromatic Dispersion Unit 10 inverted for ease of viewing).

Figure 7B:
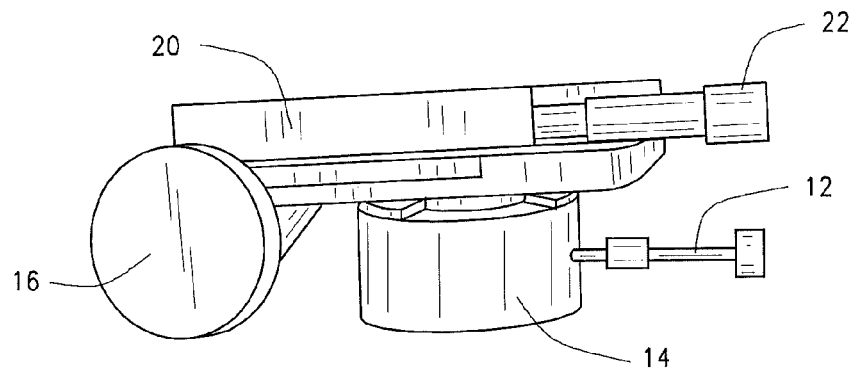
Figure 7C:
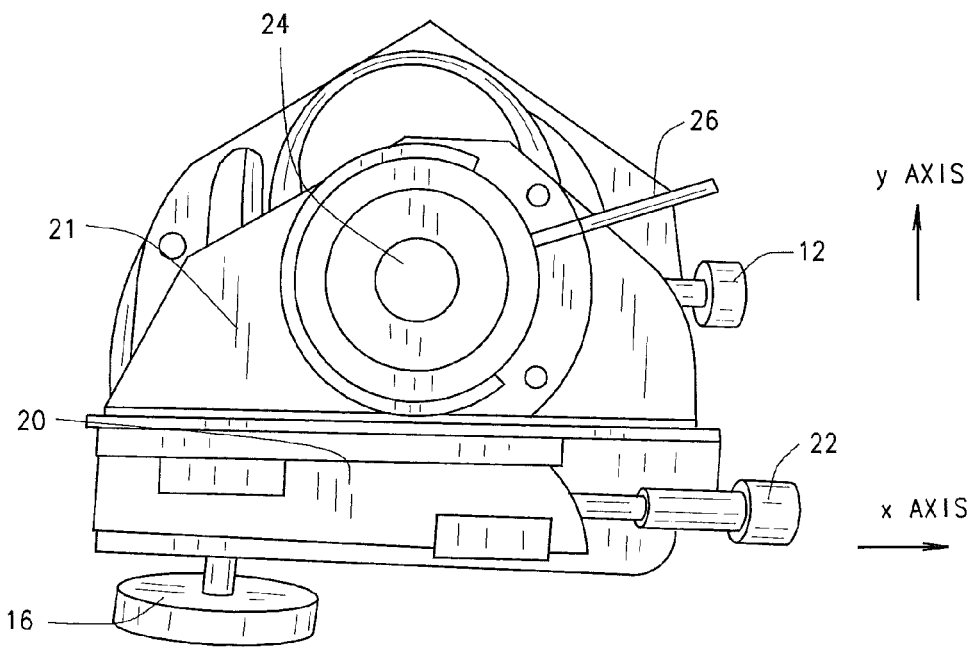

The Risley mounting bracket (18) is also mounted to an x-axis adjustment assembly (20) which was cannibalized from a standard square stage (20) such as Cynmar part number 101-01347, and is shown in FIGS. 7B and 7C. This x-axis adjustment assembly (20) includes an adjustment knob (22) which allows the table to be adjusted along the x-axis of the scope independently of the Risley Prism (12) and the Risley mounting bracket (18). A second iris (24) having an adjustment lever (26) is mounted to the x-axis adjustment assembly (20) with an iris mounting bracket (21), allowing the iris (24) to be moved along the x-axis. This iris (24) is a 22-mm to 1-mm iris, as was iris (8) above. See FIG. 7C. The distance from the topmost portion of Risley prism (12) and iris (24) is 28-mm Thus, the Risley prism (12) can be moved along the y-axis while the iris (22) can be independently moved along the x-axis. After the light travels from the Risley prism (12) through the iris (22), it leaves the Rotary Monochromatic Dispersion Unit ("RMD") (10) and travels to the Condenser (28).

IV & V Condenser (28) and Stage (34)

Figure 8:
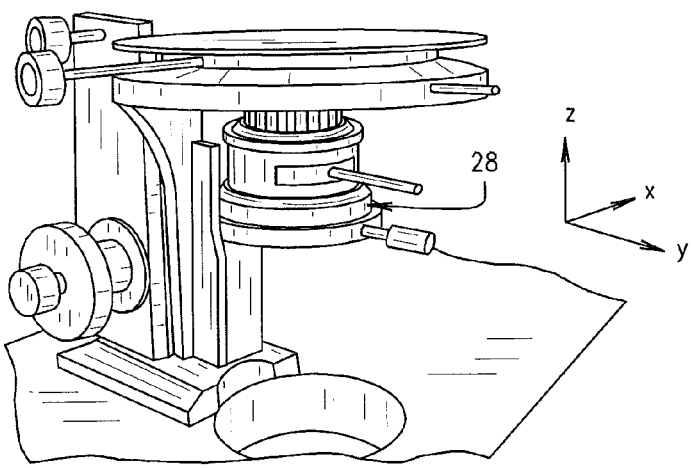
FIG. 8 a perspective view of a condenser and stage.
Figure 9A:
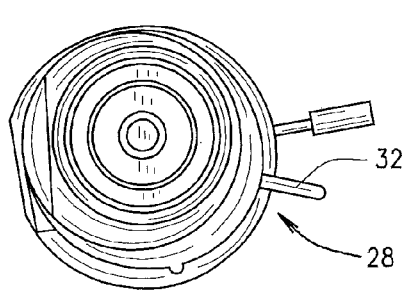
FIGS. 9A and 9B are top and side views of a condenser.
Figure 9B:
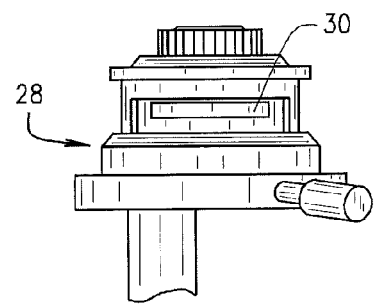

After the light has passed through the second iris (24), it proceeds 6-mm up to a standard 1.4 N.A. Zeiss condenser (28), numbered achr. apl. 1.4 (achromatic-aplanatic 1.4). See FIG. 8. As is seen in FIG. 8, the dovetail of the RMD Unit (10) connects to the bracket of the condenser (28) such that raising and lowering the condenser (28) also raises and lowers the RMD Unit (10). This condenser (28) can be substituted with other condensers, with little to no effect on the magnification or resolution of the Nanoscope. Using oil with the condenser is preferable. The condenser (28) has a third iris (30), similar to the first two and being adjustable from 22-mm to 1-mm via an adjustment lever (32). See FIGS. 9A and 9B.

Figure 10:
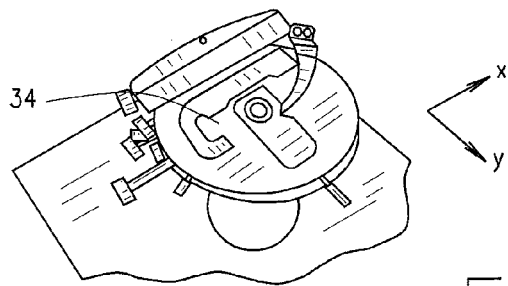
FIG. 10 is a top view of a stage.

After passing through the condenser (28), the light passes up through a Zeiss 473357-9901 Zeiss rotary microscope stage (34), in between which is oil when used. See FIG. 10.

VI & VII Objective (36) and Tubular Assembly (38)

Figure 11A:
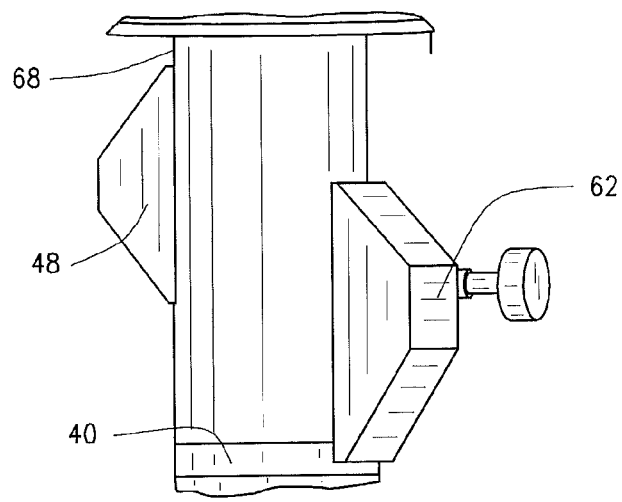
FIG. 11A is a side view of a tubular assembly.
Figure 11B:
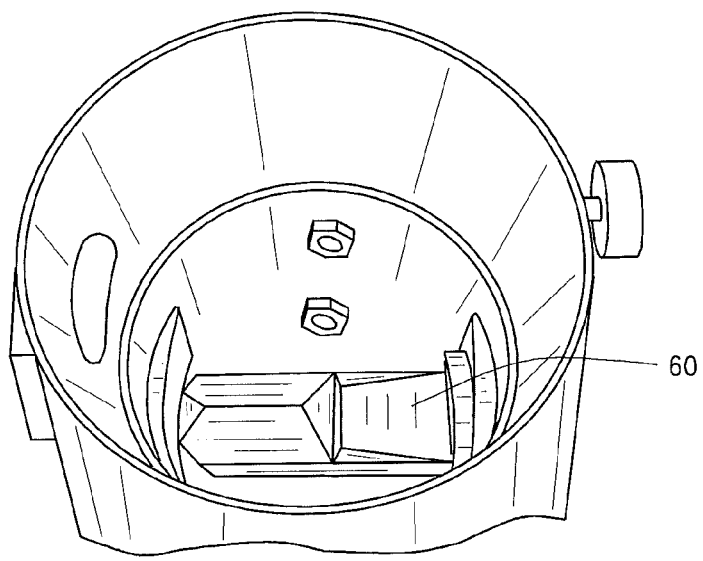
FIG. 11B is top view into a tubular assembly having an Abbe Koenig prism.

After passing the stage (34), the light travels up through the objective (36) an adjustable distance. Objectives (36) of power 5 to power 100 have been successfully used. Depending on the length of the objective, the entire assembly from the objective to the oculars can be raised and lowered with standard the course and fine adjustment knobs. After passing through the objective (36), the light travels along the z-axis into the tubular assembly (38). The tubular assembly (38) itself has five main components: the lower prism assembly (40), the right wing (48), Abbe Koenig prism (60), the left wing (62), and the upper prism assembly (68). See FIGS. 11A and 11B.

Figure 12A:
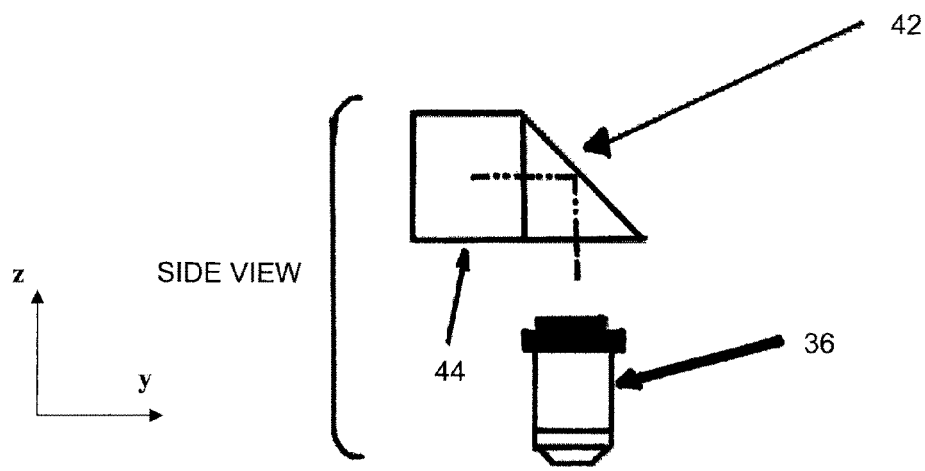
FIGS. 12A and 12B are side and top views diagramming the light path through the objective and lower prism assembly.
Figure 12B:
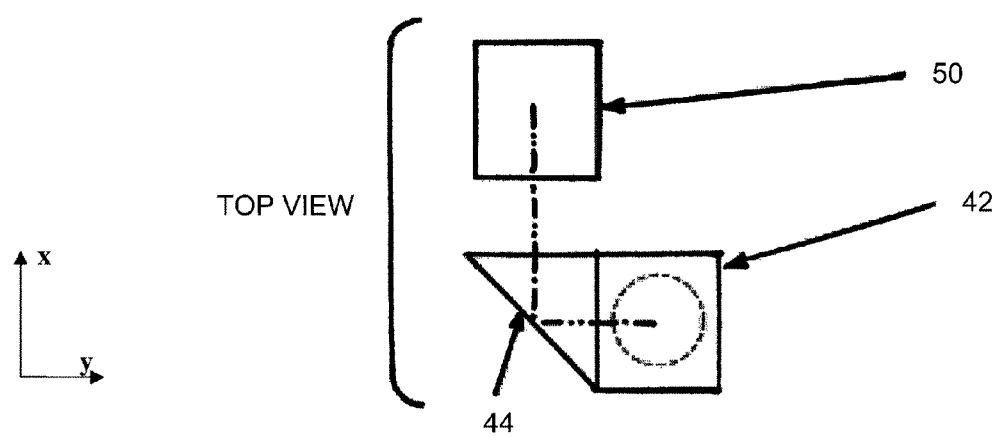
Figure 13A:
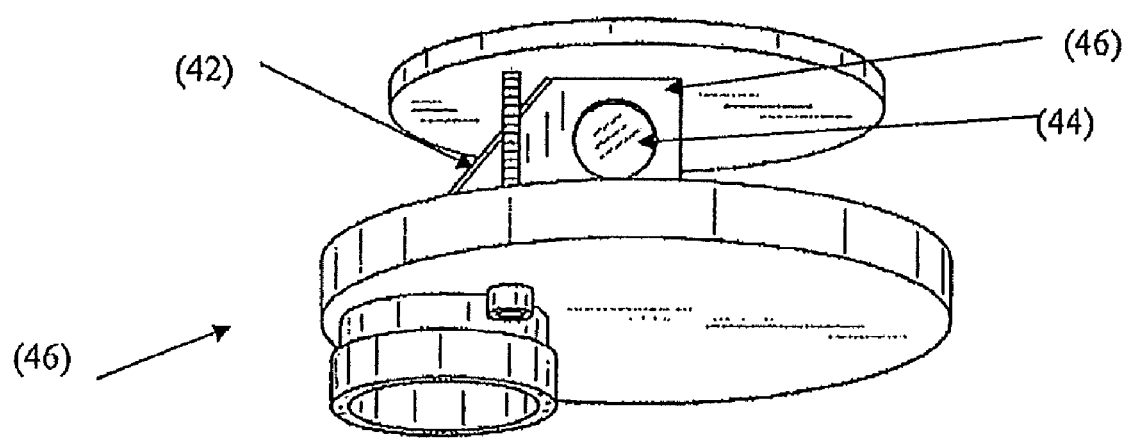
FIGS. 13A and 13B are perspective and side views of a lower prism assembly.
Figure 13B:
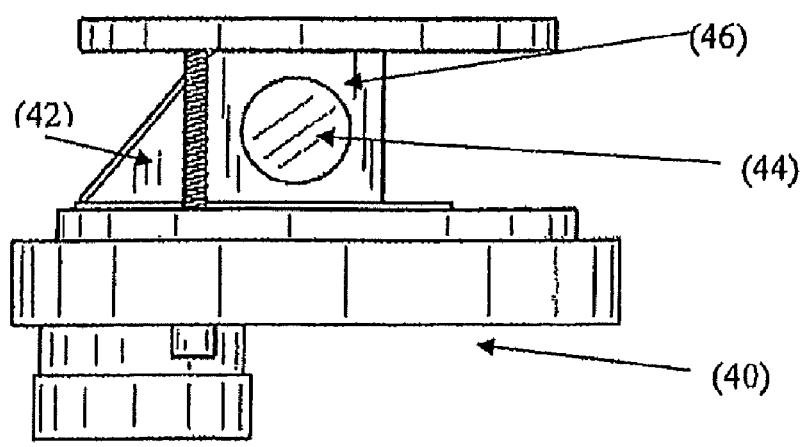
Figure 18A:
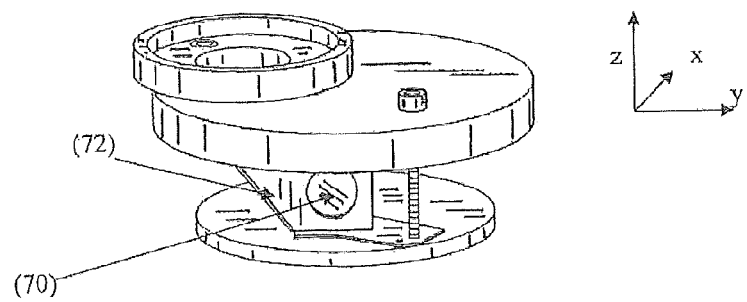
FIGS. 18A and 18B are perspective and top views of the upper prism assembly.
Figure 18B:
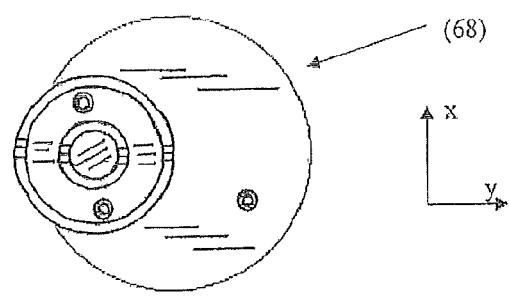
Figure 18C:
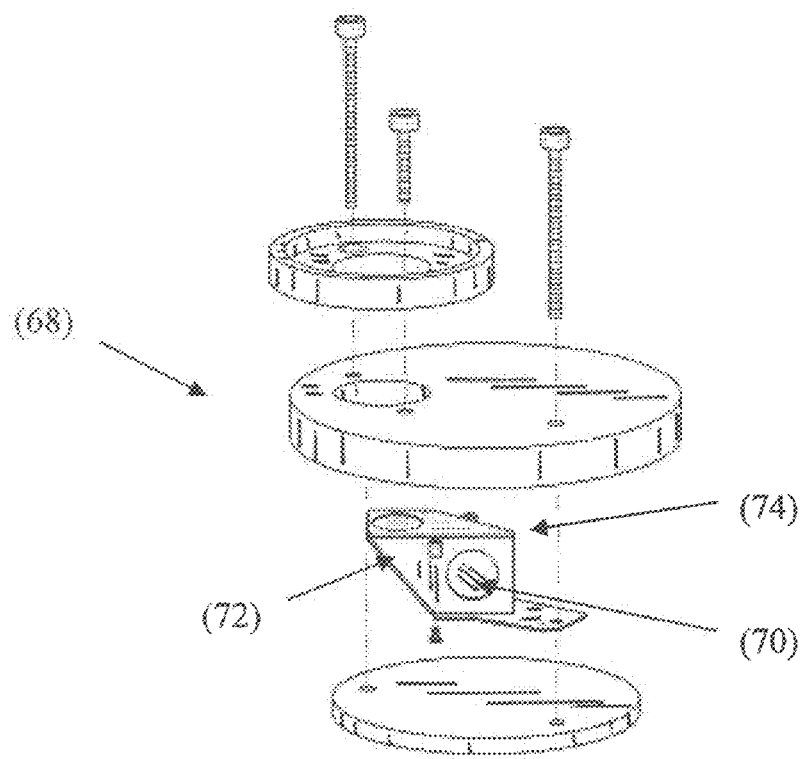
FIG. 18C is an exploded view of the upper prism assembly.
Figure 18D:
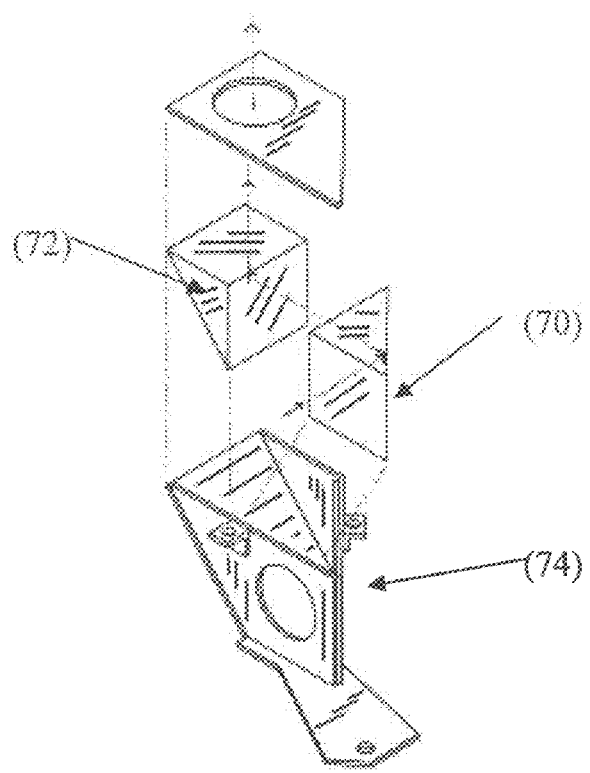
FIG. 18D is an exploded view of a dual prism holder.

The light travels from the objective (36) approximately 32-mm vertically (z-axis) up into the lower prism assembly (40), where it encounters a right angle glass prism ("RAP") (42) which directs the light from the z-axis to the y-axis toward the back of the scope where it immediately encounters another right angle glass prism (44). All RAP prisms are 22-mm wide, 21-mm deep and tall, and each are made of BK7 with a dimensional tolerance of ±0.1-mm, a surface quality of 60-40, a surface accuracy of ½λ, and angle tolerance of ±5 arc min., and have an aluminized hypotenuse, overcoated with inconel and black paint. This right angle prism (44) directs the light from the y-axis (toward the back of the scope) to the x-axis (toward the right of the scope). See FIGS. 12A and 12B. These two right angle prisms are housed in a dual prism holder (46) shown below in FIGS. 13A and 13B. See FIGS. 18C and 18D below for exploded views of the Upper prism holder (66) (which is substantially a mirror image of the lower prism holder (40)).

Figure 14:
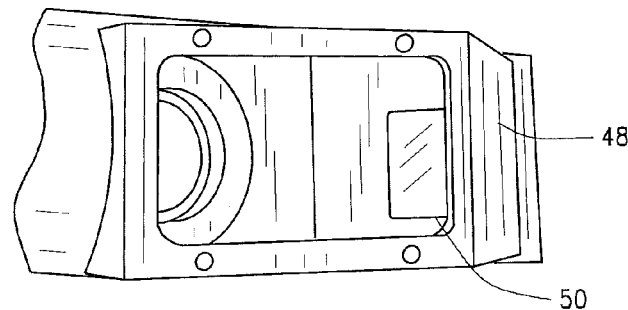
FIG. 14 is a top view of the inside of a tubular assembly wing.

The light then travels from the lower prism assembly (40) (which is connected to the bottom of the tubular assembly 38) toward the right of the scope along the x-axis approximately 35-mm where it enters the right wing (48) and encounters a third glass right angle prism (50). This right angle prism (50) directs the light from the x-axis toward the right of the scope to the z-axis toward the top of the scope. See FIG. 14, looking down into the right wing (48) with right angle prism (56) removed such that only right angle prism (50) is visible.

Figure 15A:
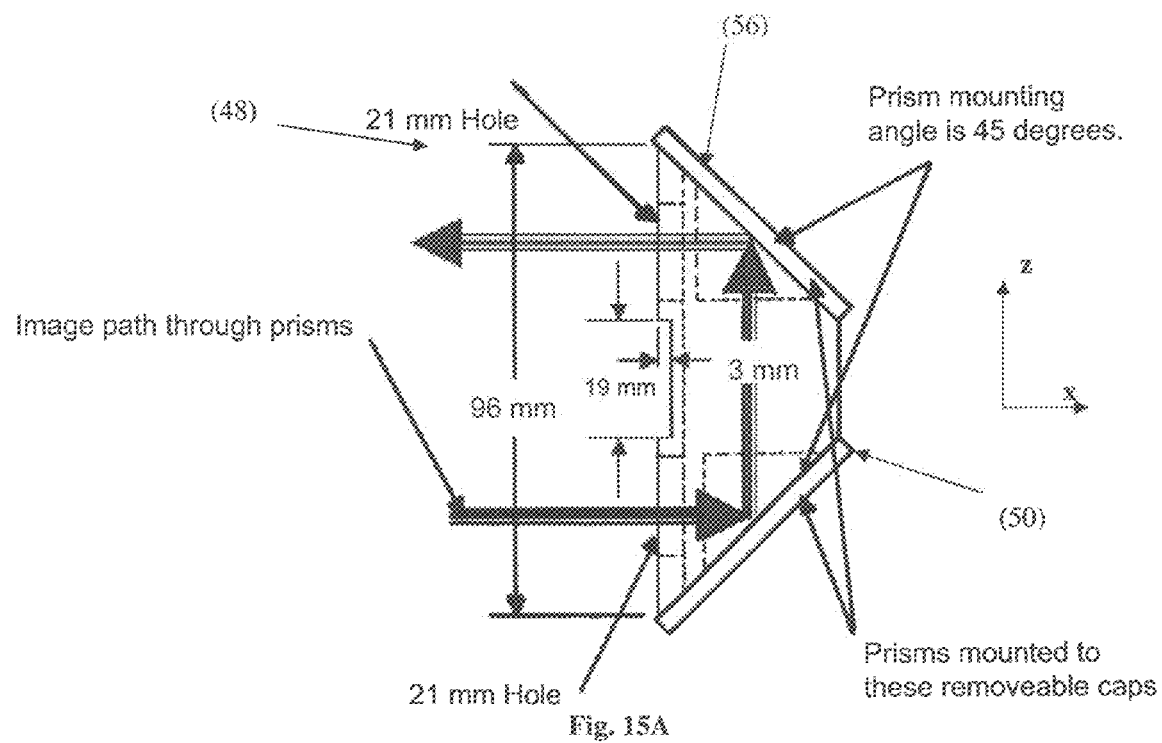
FIG. 15A is a diagram of the light path through a tubular assembly wing.
Figure 15B:
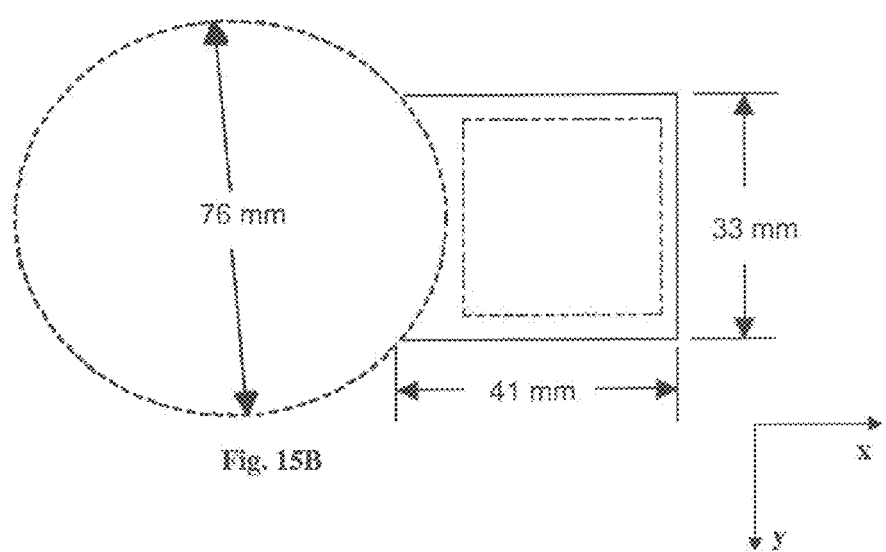
FIG. 15B is a top view of a wing relative to the tubular assembly.

Mounted on top of the right angle prism (50) may be several lenses (52, 54) of varying magnification, though preferably lens (52) is a 36-mm focal length, 12-mm diameter biconvex (or double-convex) lens, and lens (54) is a 17-mm focal length, 17-mm diameter biconvex (or double-convex) lens. Whether the light travels through these lenses or not, it travels 35-mm vertically from the third right angle prism (50) and enters a fourth right angle glass prism (56) which directs the light from the z-axis back to the x-axis, toward the left of the scope. See FIGS. 15A, 15B. Again, an additional 60-mm focal length, 17-mm diameter biconvex (or double-convex) lens (58) is optional after the right angle prism (56). These lenses tend to increase magnification but reduce resolution.

Figure 16A:
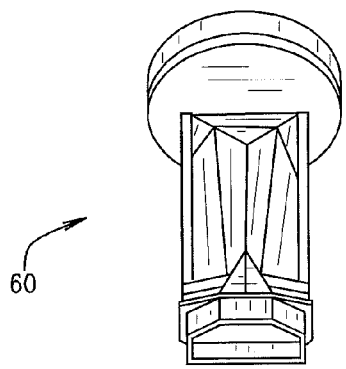
FIGS. 16A and 16B are front perspective and side views of an Abbe Koenig prism.
Figure 16B:
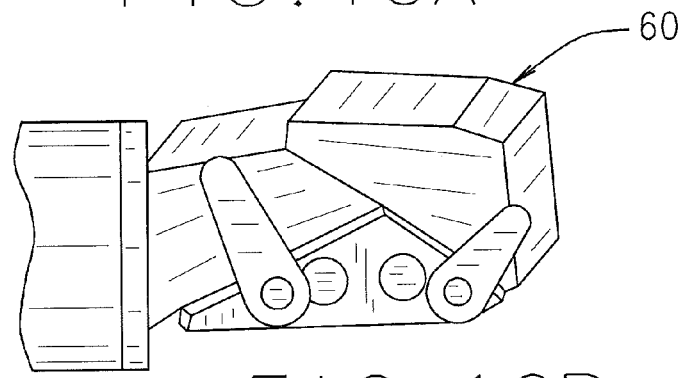

In any case, after traveling approximately 13-mm from right angle prism (56) toward the left of the scope along the x-axis, the light travels through an Abbe Koenig prism (60), which may or may not be of the type which has an air gap between the roof prism and the primary prism, and which inverts the image both horizontally and vertically. The Abbe Koenig prism is 54-mm long, 22-mm wide and 17-mm high, and is shown in FIGS. 16A and 16B below.

Figure 17B:
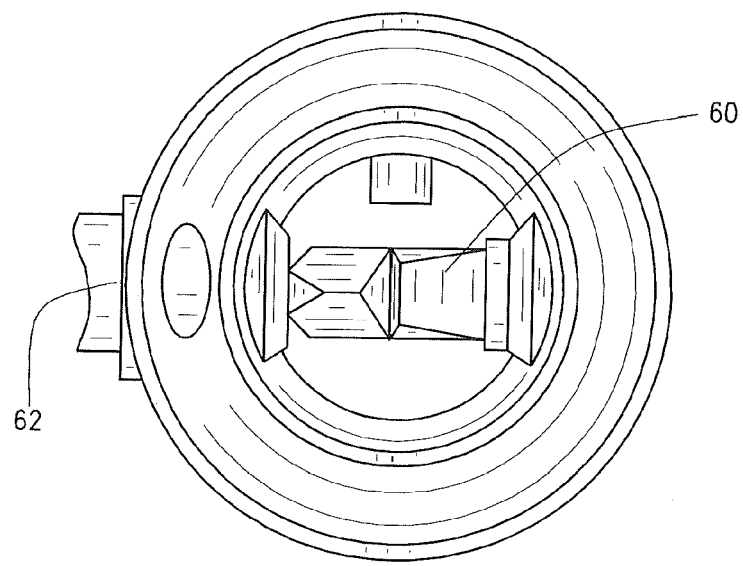
FIG. 17B is a top view of the inside of a tubular assembly.

The light then exits the Abbe Koenig prism (60), travels approximately 13-mm to the left wing (62) and encounters a fifth right angle prism (64) which redirects the light from the x-axis vertically upward along to the z-axis. The light again travels approximately 35-mm to a sixth right angle prism (66) which redirects the light from the z-axis to the x-axis toward the right of the scope. The left wing (62) is substantially a mirror image of the right wing (48) shown in FIGS. 14 and 15A above, in which the fourth right angle prism (56) of the right wing (48) is at approximately the same height as the Abbe Koenig prism (60) and the fifth right angle prism (64) of the left wing (62), as shown in the diagram and photo of the tube of tubular assembly (38) in FIGS. 17A and 17B. This tubular assembly is composed machined aluminum, though it could be composed of brass or another suitable material.

The light then enters the Upper Prism Assembly (68) and encounters a seventh glass right angle prism (70) which redirects the light from the x-axis to the y-axis toward the front of the scope where it immediately encounters an eighth right angle glass prism (72) which redirects the light vertically toward the top of the scope. The seventh and eighth right angle prisms are housed in a dual prism holder (74) as above with the lower prism assembly (40). See FIGS. 18A through 18D.

VIII. Oculars (76)

Figure 19A:
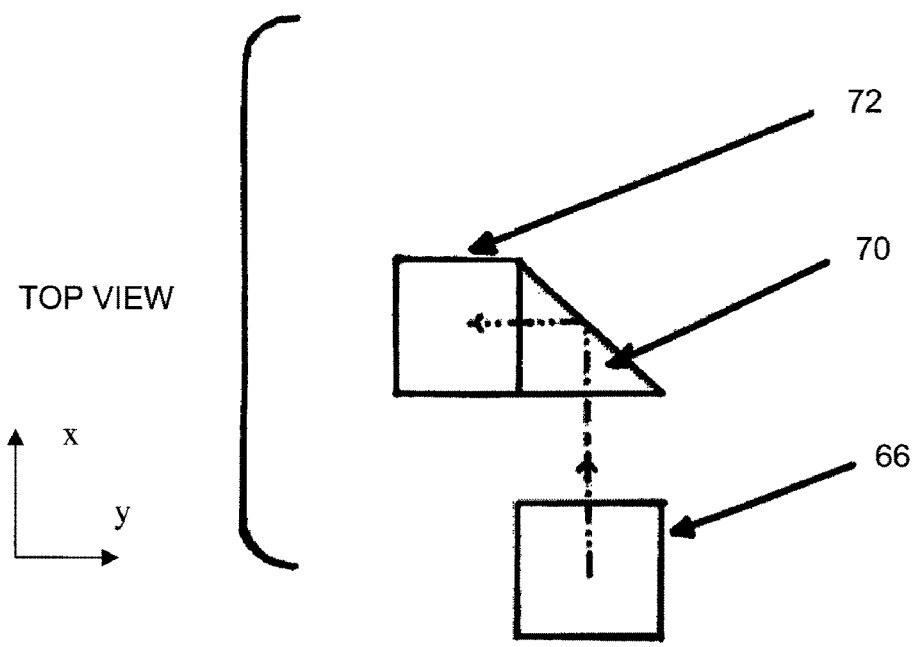
FIGS. 19A and 19B are top and side views diagramming the light path through the upper prism assembly and ocular assembly.
Figure 19B:
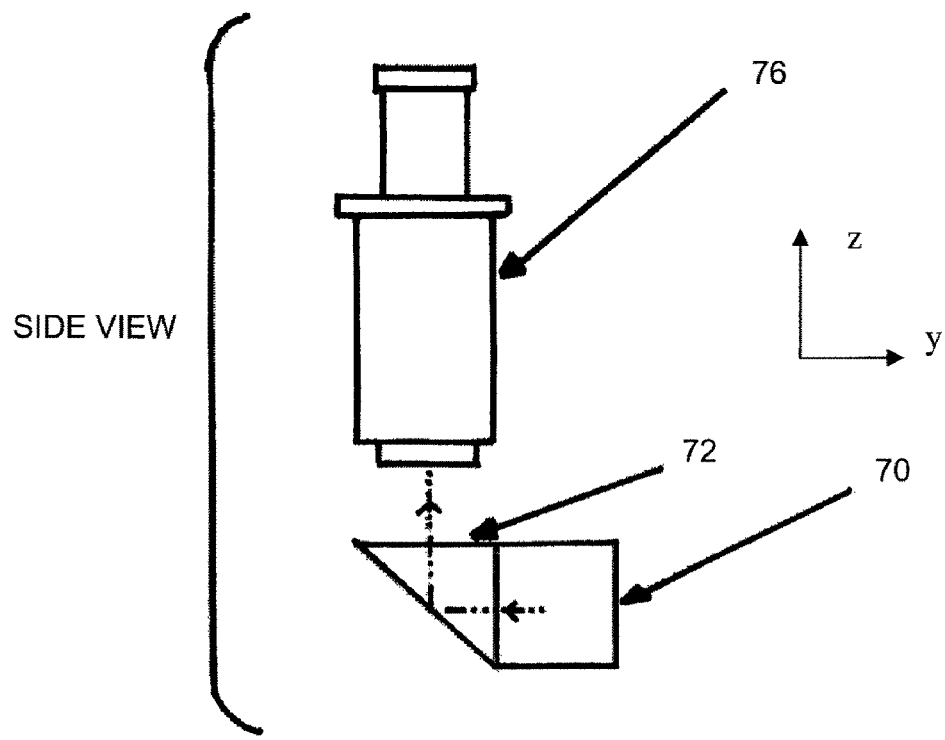

The light then exits the Upper Prism Assembly (68), and thereby exits the tubular assembly (38). It travels 19-mm until it encounters the oculars (76), as seen below in FIGS. 19A and 19B. The oculars (76) are mounted to the Upper Prism Assembly (68) as shown in FIG. 1, and are 10× each. The exact oculars used are a Carlsan CS700, though it is envisioned that nearly any oculars would suffice. The image may be viewed through the oculars or may be recorded by a camera attached to the ocular assembly.

EXAMPLE

Figure 20:
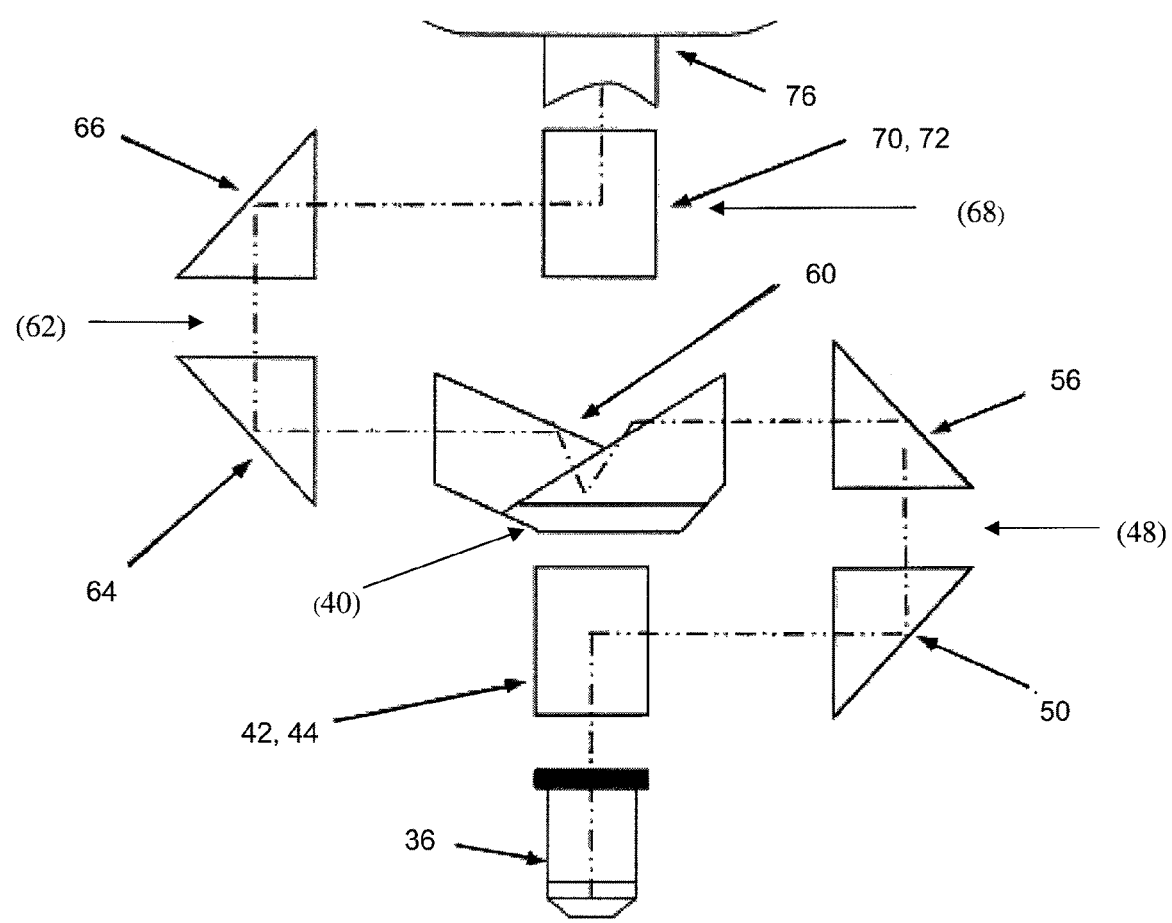
FIG. 20 is a side view diagram of the light path from the objective through the tubular assembly through the ocular assembly.

What follows are two examples of the Truman Nanoscope in use. The same sample of blood was viewed in both examples, and the objective in both is a 40× objective. In the first example, the optional lenses (52, 54, 58) were not used, such that the optical components in the tubular assembly 38 are as shown in FIG. 20.

Prior to conducting the example procedure, all of the adjustable components of the scope were zeroed out: the irises (8, 24, 30) were opened fully to their 22-mm positions; the Risley prism (12) was centered over the Iceland Spar (6) and set to zero degrees; and the tubular assembly (38) was raised such that the objective (36) was 15-mm above the stage (34). There was effectively no image visible.

Figure 21:
FIG. 21 is an exemplary out of focus image taken through a microscope according to one embodiment of the present invention.

The Risley prism (12) was then rotated from zero to 25 diopters (75 degrees), the first iris (8) was set to a diameter of 6-mm, the second iris (24) was set to a diameter of 7-mm, and the third iris (30) was set to a diameter of 3-mm. The tubular assembly (38) was lowered such that the height of the objective (36) off of the stage (34) was approximately 2-mm. This height resulted in an image that was slightly out of focus, as seen in FIG. 21.

Figure 22:
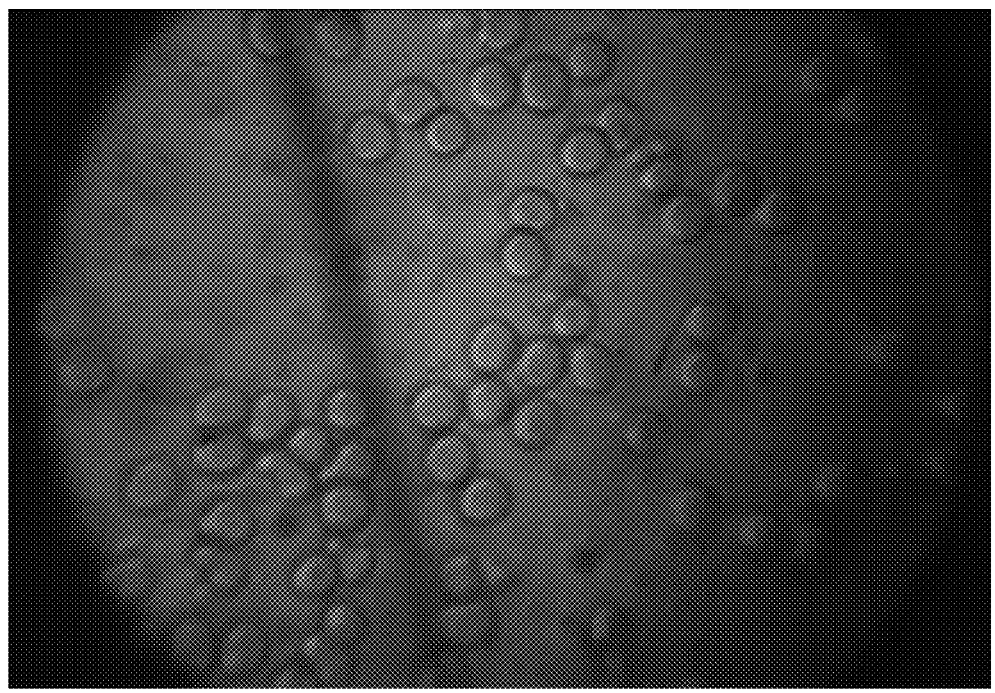
FIG. 22 is an exemplary focused imaged taken through a microscope according to one embodiment of the present invention.

From this position, the tubular assembly (38) was lowered by another 30 graduations of the fine adjustment knob, which equals approximately 0.0033 inches. This adjustment resulted in the focused image as seen in FIG. 22.

Figure 23:
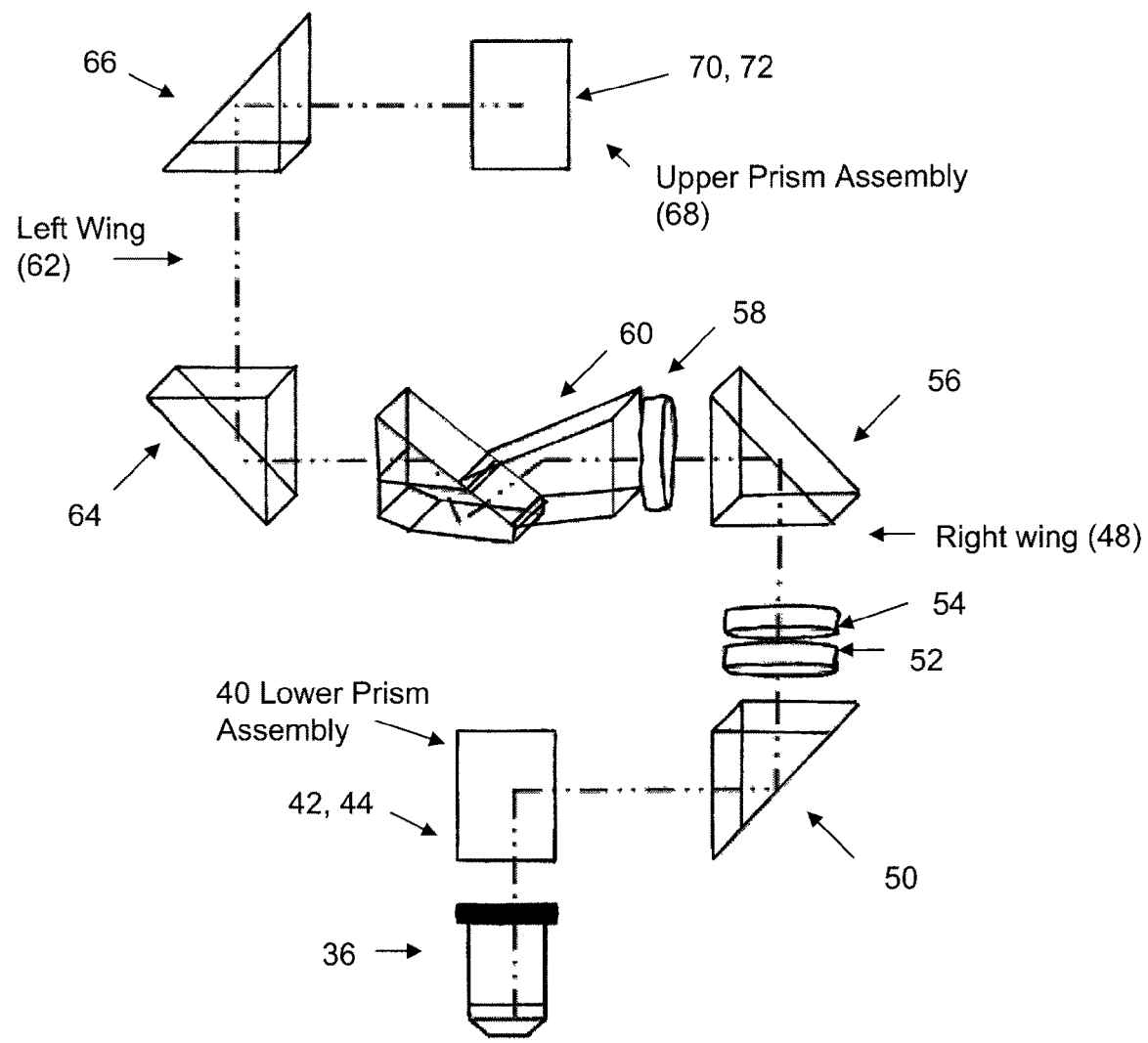
FIG. 23 is a side view diagram of the light path from the objective through the tubular assembly through the ocular assembly with additional lenses.

In the second example, the optional lenses (52, 54, 58) were used, such that the optical components in the tubular assembly 38 are as shown in FIG. 23.

Prior to conducting the example procedure, all of the adjustable components of the scope were again zeroed out: the irises (8, 24, 30) were opened fully to their 22-mm positions; the Risley prism (12) was centered over the Iceland Spar (6) and set to zero degrees; and the tubular assembly (38) was fully raised such that the objective (36) was 15-mm above the stage (34). There was effectively no image visible.

Figure 24:
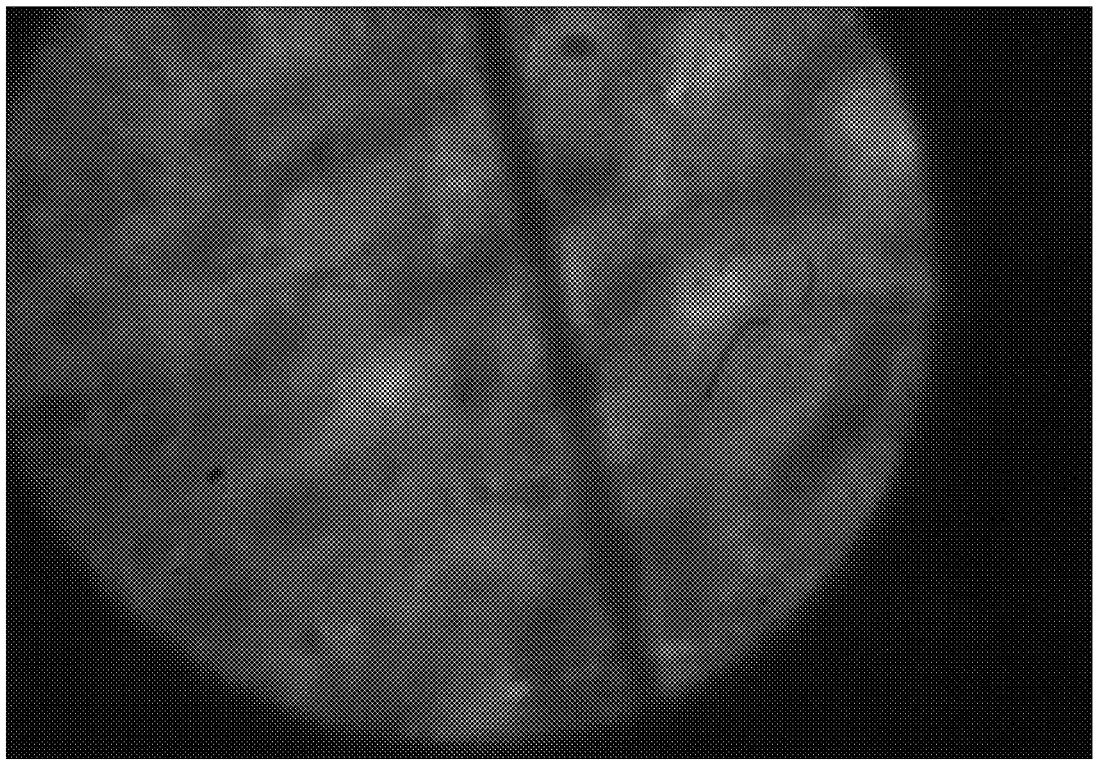
FIG. 24 is an exemplary out of focus image taken through a microscope according to one embodiment of the present invention.

The Risley prism (12) was then rotated from zero to 25 diopters (75 degrees), the first iris (8) was set to a diameter of 6-mm, the second iris (24) was set to a diameter of 7-mm, and the third iris (30) was set to a diameter of 3-mm. The tubular assembly (38) was lowered such that the height of the objective (36) off of the stage (34) was approximately 2-mm. This height resulted in an image that was slightly out of focus, as seen in FIG. 24.

Figure 25:
FIG. 25 is an exemplary focused imaged taken through a microscope according to one embodiment of the present invention.

From this position, the tubular assembly (38) was lowered by another 30 graduations of the fine adjustment knob, which equals approximately 0.0033 inches. This adjustment resulted in the focused image as seen in FIG. 25.

Figure 26:
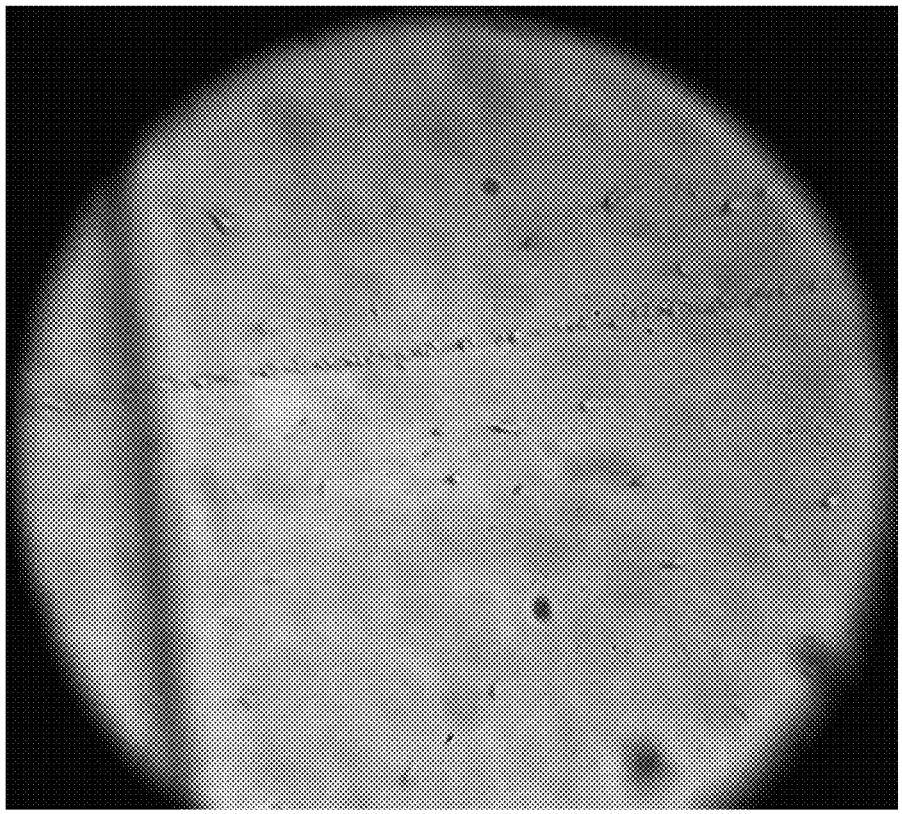
FIG. 26 is an exemplary image of 0.11 micron poly latex microspheres, taken with a 40× objective according to one embodiment of the present invention.
Figure 27:
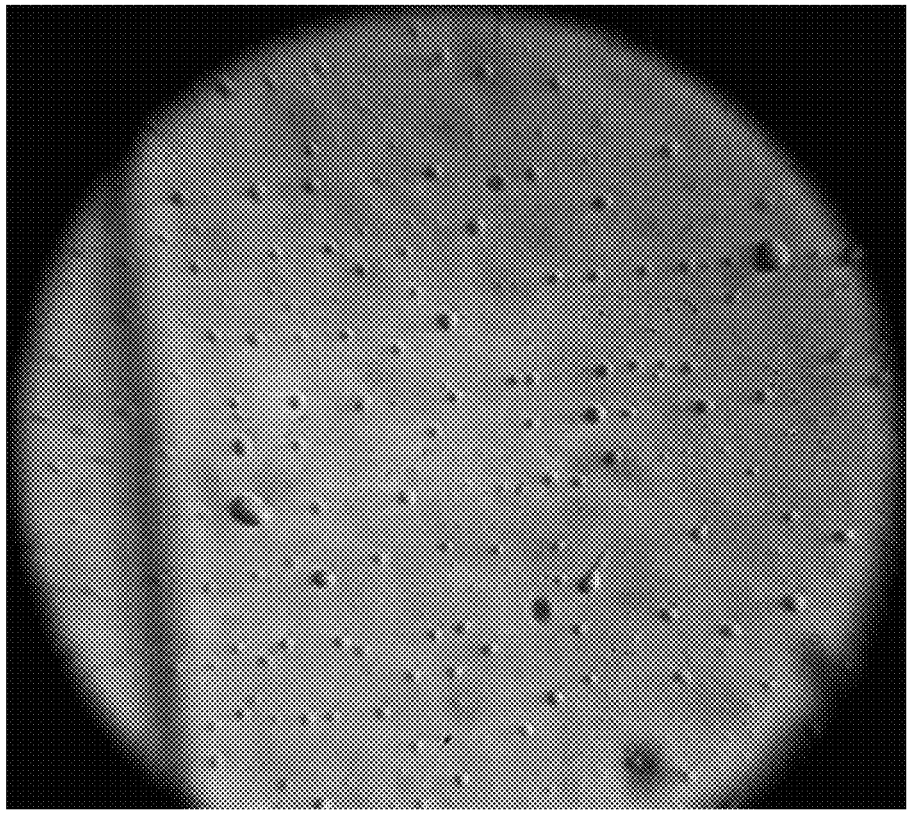
FIG. 27 is an exemplary image of 0.11 micron poly latex microspheres, taken with a 40× objective according to one embodiment of the present invention.
Figure 28:
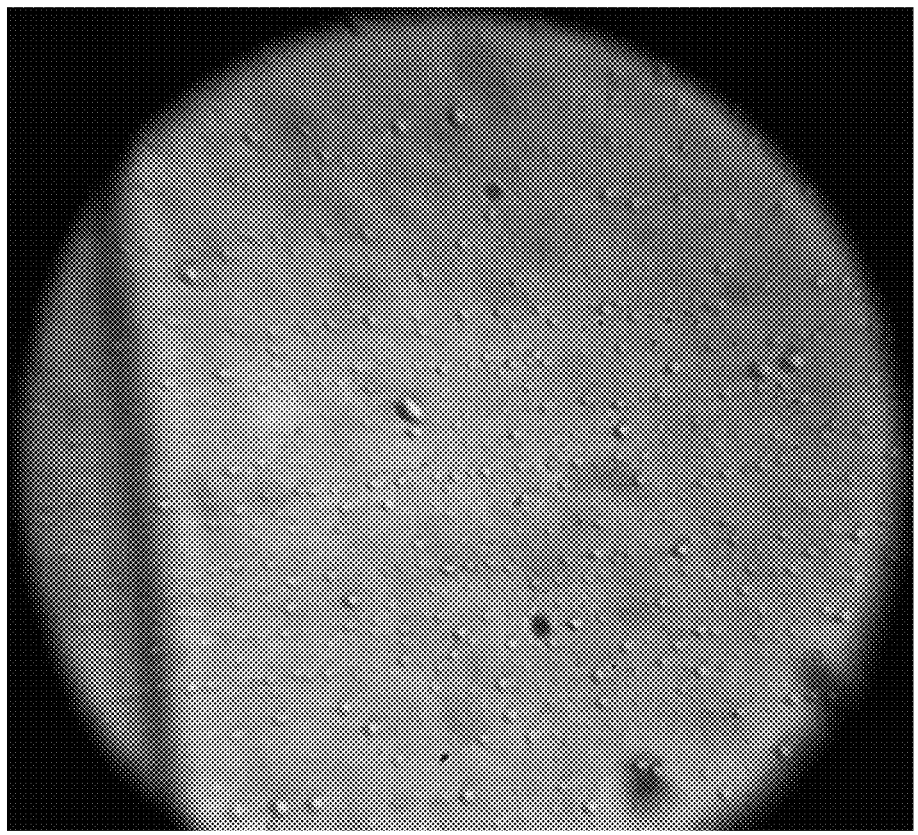
FIG. 28 is an exemplary image of 0.11 micron poly latex microspheres, taken with a 40× objective according to one embodiment of the present invention.
Figure 29:
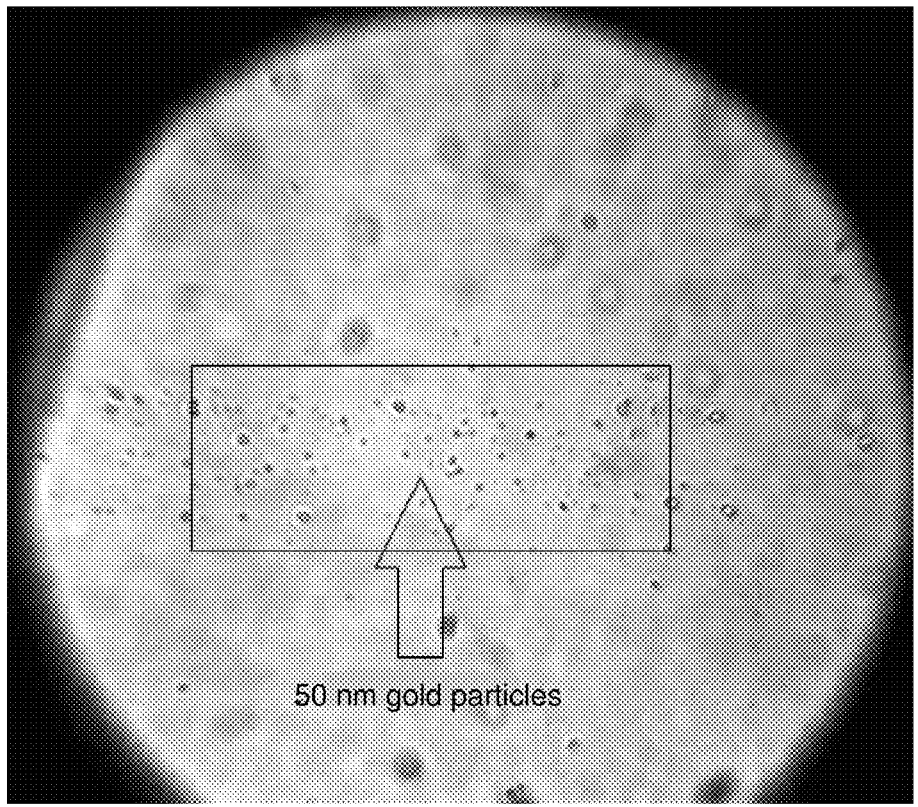
FIG. 29 is an exemplary image of 0.05 micron gold particles, taken with a 40× objective according to one embodiment of the present invention.
Figure 30:
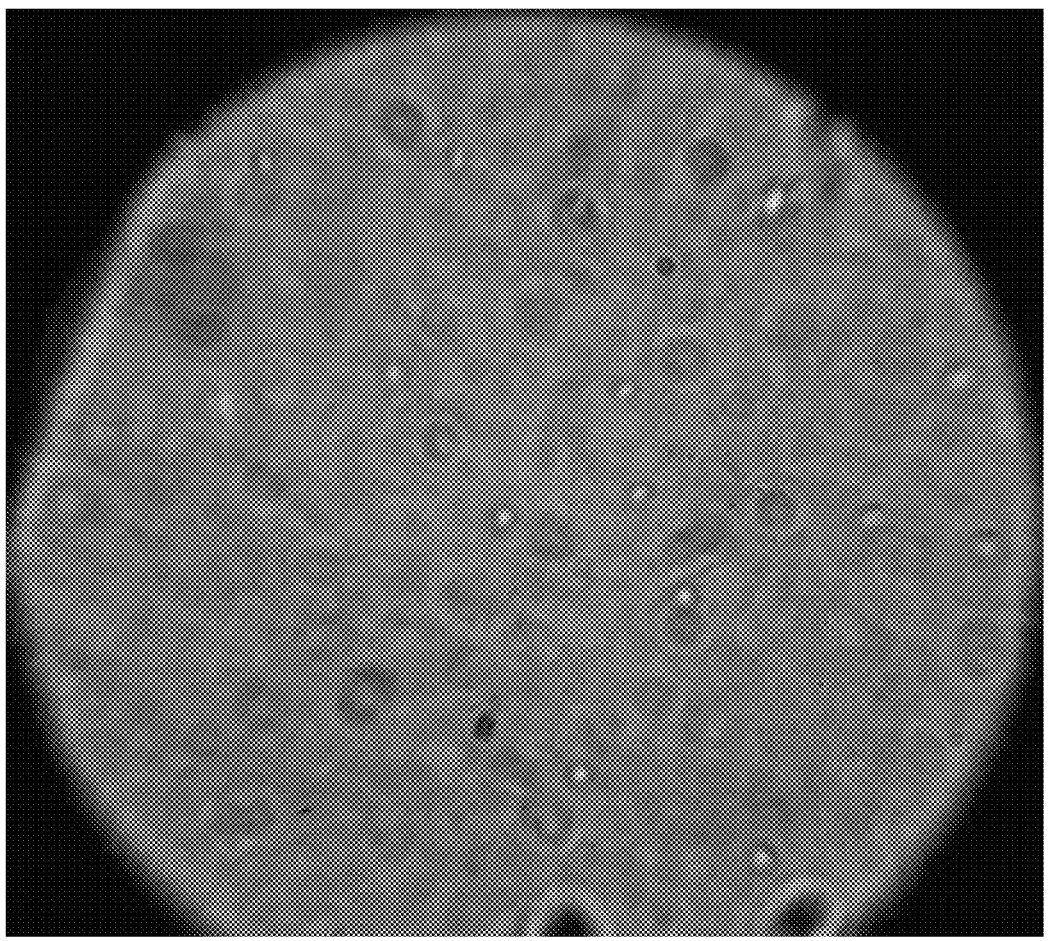
FIG. 30 is an exemplary image of 0.05 micron gold particles, taken with a 100× objective according to one embodiment of the present invention.

FIGS. 26 through 28 are additional examples of images taken of 0.11 micron poly latex microspheres through an optical microscope with a 40× objective according to an embodiment of the present invention. FIGS. 29 and 30 are additional examples of images taken of 0.050 micron gold particles through an optical microscope with 40× and 100× objectives, respectively, according to an embodiment of the present invention.

Alternatives

Figure 31:
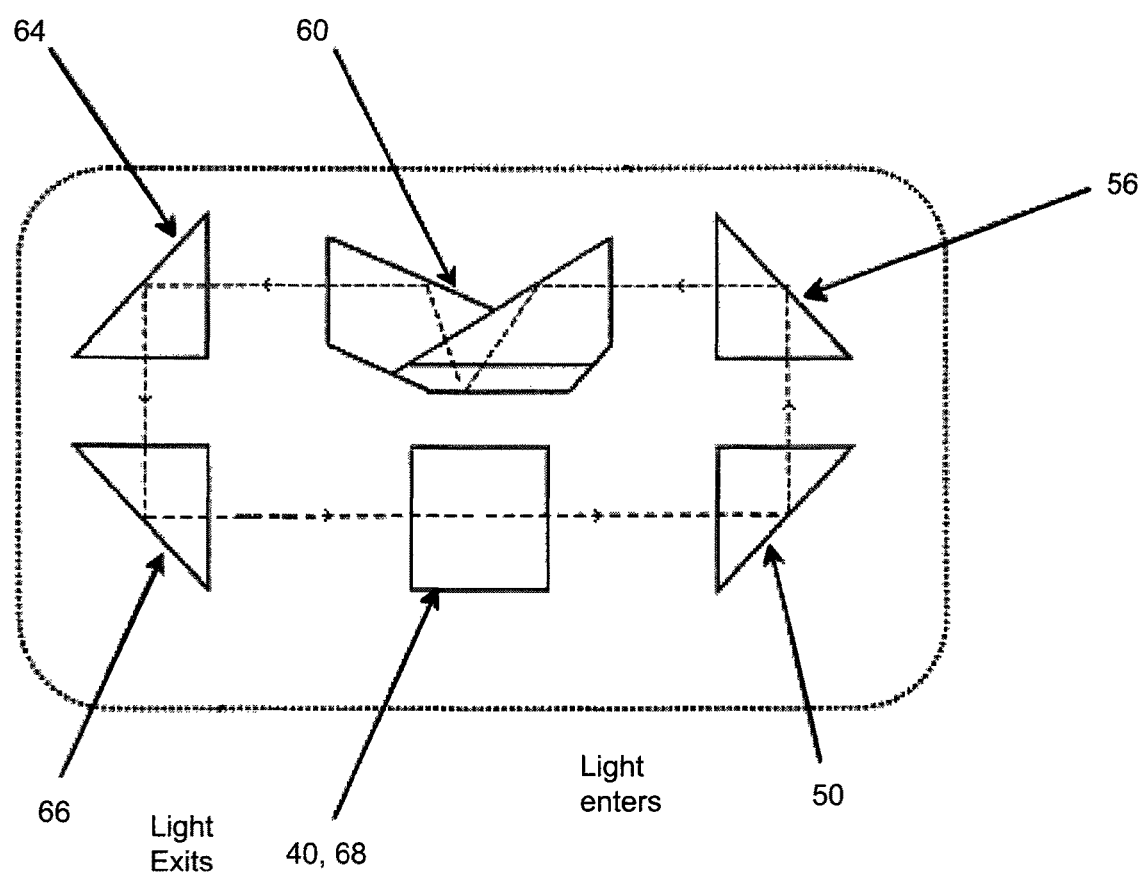
FIG. 31 is a top view diagram of an alternative arrangement of the components of the tubular assembly.

The tubular assembly (38), as opposed to being oriented vertically, could be oriented substantially horizontally as shown in the FIG. 31.

While particular elements, embodiments, and applications of the present invention have been shown and described, it is understood that the invention is not limited thereto because modifications may be made by those skilled in the art, particularly in light of the foregoing teachings. It is therefore contemplated by the appended claims to cover such modifications and incorporate those features which come within the spirit and scope of the invention.

We claim:

1. An optical microscope including:
a base unit containing a birefringent prism;
a rotary monochromatic dispersion unit containing at least one Risley Prism;
a condenser;
a stage;
an objective;
a tubular assembly containing an Abbe Koenig prism; and
an ocular assembly, where light travels sequentially through the base unit, rotary monochromatic dispersion unit, condenser, stage, objective, tubular assembly and ocular assembly to produce an image of a specimen on said stage.

2. An optical microscopy method including:
directing light from a light source through a birefringent material;
directing said light from said birefringent material through a standard microscope condenser, stage and objective;
directing light from said objective through a tubular assembly containing an Abbe Koenig prism;
directing light from said tubular assembly through an ocular assembly for viewing by a user.

* * * * *